US006614134B1

(12) United States Patent
Davies

(10) Patent No.: US 6,614,134 B1
(45) Date of Patent: Sep. 2, 2003

(54) POWER SUPPLIES FOR ECUS

(75) Inventor: Garry Raymond Davies, Rugby (GB)

(73) Assignee: Lucas Industries plc (GB)

( * ) Notice: Subject to any disclaimer, the term of this patent is extended or adjusted under 35 U.S.C. 154(b) by 298 days.

(21) Appl. No.: 09/643,802

(22) Filed: Aug. 22, 2000

(Under 37 CFR 1.47)

Related U.S. Application Data

(63) Continuation of application No. PCT/GB99/00319, filed on Jan. 29, 1999.

(30) Foreign Application Priority Data

Feb. 24, 1998 (GB) ............................................. 9803720

(51) Int. Cl.[7] .................................................. H02J 7/00
(52) U.S. Cl. ......................... 307/64; 307/109; 307/110
(58) Field of Search ........................... 307/64, 110, 109, 307/9.1, 10.1; 323/282; 363/59, 60

(56) References Cited

U.S. PATENT DOCUMENTS

| 4,533,986 A | | 8/1985 | Jones |
| 5,506,775 A | | 4/1996 | Tsurushima et al. |
| 5,808,883 A | * | 9/1998 | Hawkes ........................ 363/60 |
| 6,011,440 A | * | 1/2000 | Bell et al. ..................... 330/297 |

FOREIGN PATENT DOCUMENTS

| EP | 0 183 597 A | | 6/1986 | |
| GB | 2 262 003 A | | 6/1993 | |
| GB | 2 262 003 | * | 6/1993 | ............. H02J/9/06 |

* cited by examiner

Primary Examiner—Brian Sircus
Assistant Examiner—Robert L DeBeradinis
(74) Attorney, Agent, or Firm—MacMillan, Sobanski & Todd, LLC

(57) ABSTRACT

A voltage supply circuit for an ECU, of the type which uses a capacitor to hold charge for use in maintaining the supply during temporary supply interruptions, wherein a charge pump is provided for increasing the voltage available for charging the capacitor to a level above that of the supply to enable the stored energy of the capacitor to be boosted.

12 Claims, 2 Drawing Sheets

POWER SUPPLIES FOR ECUS

CROSS REFERENCE TO RELATED APPLICATIONS

This application is a continuation and claims the benefit of International Application No. PCT/GB99/00319, filed Jan. 29, 1999, and the United Kingdom Patent Application No. GB9803720.3 filed on Feb. 24, 1998.

The present invention relates to power supplies for microprocessors acting as electronic control units/controllers (ECUs) and is concerned in particular with the problem of maintenance of ECU operation in the event of unintentional power supply interruptions.

Microprocessors are used widely to control systems that are safety-critical, for example electronic servo braking systems in vehicles, vehicle anti-lock braking systems, vehicle engine management systems, vehicle active suspension systems, vehicle ignition system, and the like.

Since it is common for a controller in a vehicle to experience a very harsh power supply, it is important that such controllers be arranged to have a high immunity to electrical noise generated within, or transmitted to it, by its operational environment.

The supply voltage to an ECU controller is unpredictable, and may contain many glitches and spikes of high energy, fast transient or long duration disturbance. These disturbances constitute noise in the electrical supply system and, if the ECU power supply system is not adequate to cope with such noise, the ECU may give unpredictable results, and degrade system and vehicle performance.

The source of noise in the electrical system of a vehicle may be generated from a wide variety of sources, such as fans, relays, rapid changes in current through inductive loads (spikes), high current transients through the battery source impedance (glitches), alternator and starter motor noise and ignition circuit noise. An ECU power supply must be designed to both tolerate and operate within these worst case (noise) conditions.

For example, in a practical situation, a controller may have a specification to work down to 7.000 volts continuous battery (from a normal 12 volt level), and operate during a condition where the supply to the ECU has a supply interruption where the voltage falls instantaneously to zero, remains at that level for some time, then rises up to 7.000 volts again. The controller needs to be fully functional during this disturbance and so requires a power supply with "hold-up" capabilities.

The traditional way to achieve hold-up operation for the controller supply is illustrated in FIG. 1 of the attached drawings which shows the input of a voltage regulator 10 coupled to a B⁺ supply (say 12 volts) via a forward biassed blocking diode $D_1$. Coupled in parallel between the input of the low-drop voltage regulator 10 and the other power supply line 12 are a high power zener diode $Z_1$, and an electrolytic storage capacitor $C_1$. The B⁺ line normally also includes a current limiting resistor (not shown). The voltage regulator output is on a line 14 and leads to the controller itself (not shown).

This circuit copes with supply interruptions by storing charge within the electrolytic capacitor $C_1$. The energy stored (E) is given by:

$$E = 0.5 \cdot C \cdot V^2$$

where
E is in Joules
C is in Farads
V is in Volts
The equation can be expanded to give:

$$E = 0.5 \cdot C \cdot (V_1 - V_2)^2,$$

where
$V_1$ = Capacitor start voltage before supply interruption
$V_2$ = Capacitor end voltage that causes the voltage regulator to be out of regulation.

In order for this circuit to be successful, therefore, the capacitor $C_1$ must be physically large enough to cope with supply interruptions from a low start voltage, eg. when cranking the engine. The rated voltage of the capacitor must be at least the clamp voltage of the zener $Z_1$. Furthermore, the rated capacity of the capacitor must be large as $V_1 - V_2$ is small. Thus, the capacitance value, and hence the physical size of the capacitor, must increase as supply voltage falls. For a constant value of the required energy, the capacitance C must be $2E/V^2$.

This results in the requirement for a physically large capacitor.

There is known already from GB-A-2262003 an arrangement for providing protection against a drop in supply voltage wherein a supply voltage at an input terminal is applied to an output terminal via a Schottky diode, a capacitor is charged to a voltage greater than the supply voltage by a voltage step-up circuit, and the capacitor is connected to the output terminal when an FET is turned on in response to a circuit sensing that the voltage at terminal has dropped below a predetermined level. The step-up circuit includes a charge pump circuit and a voltage regulating and current limiting circuit. The charge pump circuit charges first and second capacitors, respectively to two and three times the input voltage. The input of regulator is connected to the first capacitor and the second capacitor provides a bias voltage for FET.

SUMMARY OF THE INVENTION

This invention relates to the maintenance of ECU operation in the event of unintentional power supply interruptions.

There is therefore a need for a circuit by which the physical size of the capacitor could be smaller for a given performance. As described above, known methods for maintaining ECU operation typically require a physically large capacitor. There is therefore a need for a circuit by which the physical size of the capacitor could be smaller for a given performance.

An object of the present invention is to provide a circuit which controls the input voltage of a voltage regulator at a substantially constant level for the duration of a supply interruption.

In accordance with the present invention, there is provided a voltage supply circuit for an ECU, of the type which uses a capacitor to hold a charge for use in maintaining the supply during temporary supply interruptions, wherein a means is provided for increasing the voltage available for charging the capacitor continuously to a level above that of the supply to enable the stored energy of the capacitor to be boosted, characterised in that the charged capacitor is arranged to be selectively coupled to the input of a voltage regulator when the regulator input voltage falls to a predetermined level as a result of a supply interruption, such as thereafter to maintain the regulator input voltage substantially at that level until the supply interruption is over, and in that a voltage dependent on the input voltage of the regulator is input to a comparator whose output controls the conduction of a path connecting the charged capacitor to the regulator input.

Preferably, the path whose conduction can be controlled comprises a first switching transistor having a control terminal coupled to the output of the comparator, detection of a fall in the input voltage to the voltage regulator causing the comparator to provide an output which results in a control input to the first transistor such as to open the transistor and couple the charged capacitor to the input of the voltage regulator.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
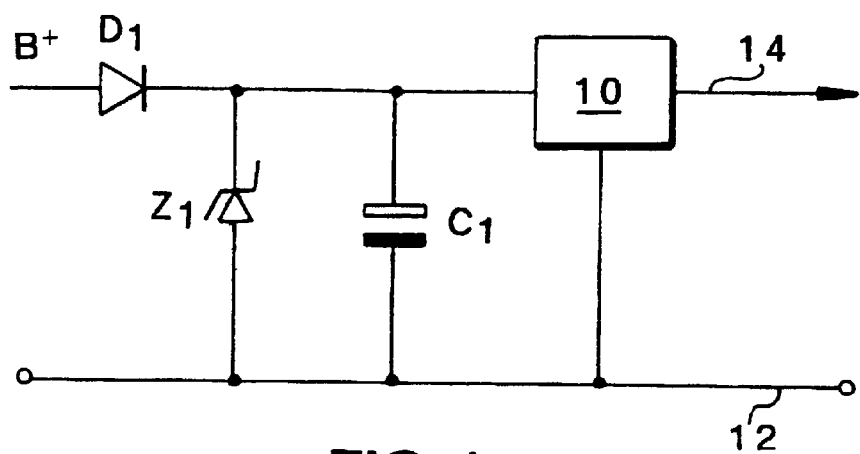
FIG. 1 is a simplified circuit diagram of a conventional circuit used upstream of a voltage regulator to smooth unwanted supply disturbances.

Referring now to FIG. 2, the circuit again includes a conventional voltage regulator 10 connected to the $B^+$ battery supply voltage via a diode $D_1$ and an input line 16. The voltage regulator is connected to the other supply line 12 by a line 18. Resistors $R_1$ and $R_2$ connected between the supply lines 12, 16 form a voltage divider, the interconnection of these resistors being. connected to a first input (−) of an op-amp forming a comparator 20 whose second input (+) is connected to a reference voltage Vref. The output of the comparator 20 is coupled firstly back to its first input (−) and secondly to the base of a transistor $Tr_1$, via a resistor $R_4$. The emitter of the transistor $Tr_1$, is connected to the supply line 12 and its collector is connected via a resistor $R_5$ to the base of a further transistor $Tr_2$, whose collector is connected to the supply line 16 and whose emitter is connected by a line 22 to a charge pump in the form, in this example, of a $n^{th}$ order voltage multiplier 24. The base and emitter of the transistor $Tr_2$ are coupled by a resistor $R_6$. This circuit operates as follows.

During normal operation with the voltage input to the regulator on line 16 being above its drop-out voltage, the transistor $Tr_2$ is non-conducting (off). The charge pump 24 operates continuously to charge the capacitor $C_2$ up to its normal rated working voltage, corresponding in the case of the use of an $n^{th}$ order voltage multiplier to a voltage of $n \times B^+$. The capacitor $C_2$ is therefore held at a voltage well above the $B^+$ level. The transistor $Tr_2$ is off at this time as the voltage on line 16 into the regulator 10 is above its threshold. However, in the event of an interruption to the $B^+$ supply, the voltage input to the op-amp 20, picked off between $R_1$ and $R_2$ controls the transistor $Tr_2$, via $Tr_1$, so that it opens sufficiently to maintain the voltage on the input to the regulator 10 (line 16) above its drop-out voltage level. Thus, the effect is to monitor the input supply voltage to the voltage regulator and, when the voltage approaches or falls below its threshold, to connect the charge in the capacitor $C_2$ to the input to the regulator to maintain its operative condition. $R_1$, $R_2$ and $R_3$ control the threshold and gain of the op-amp 20. With the illustrated embodiment, the capacitor $C_2$ is effectively controlled by an active device, formed by the voltage divider $R_1$, $R_2$ of the op-amp 20 and transistors $Tr_1$, $Tr_2$, to hold the regulator input at a fixed voltage level, usually just above the worst-case "drop-out voltage" of the regulator for optimum circuit performance. However, in a simpler case (not shown), the capacitor $C_2$ could simply be connected via an instantaneous low impedance switching method so as to couple its stored charge to the regulator input.

With the illustrated embodiment, compared to the known circuit of FIG. 1, the present circuit can accommodate a longer lasting supply interruption for a given physical size of capacitor because it is being charged to a higher voltage, the stored energy available being dependent upon the square of the voltage, as evident from the energy equation:

$$E = 0.5.C.V^2$$

Since the capacitor always stores charge and is working at or close to its maximum storage capacity, and since the operating voltage available to the regulator is closer to the working voltage of the capacitor, significant operational improvements are obtained.

Figure 3:
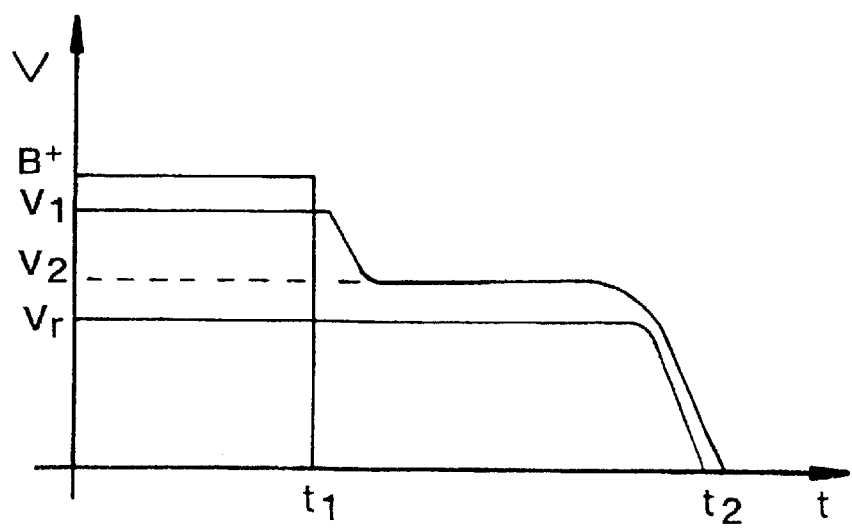
FIG. 3 comprises a number of curves illustrating the operation of the circuit of FIG. 2.
Figure 2:
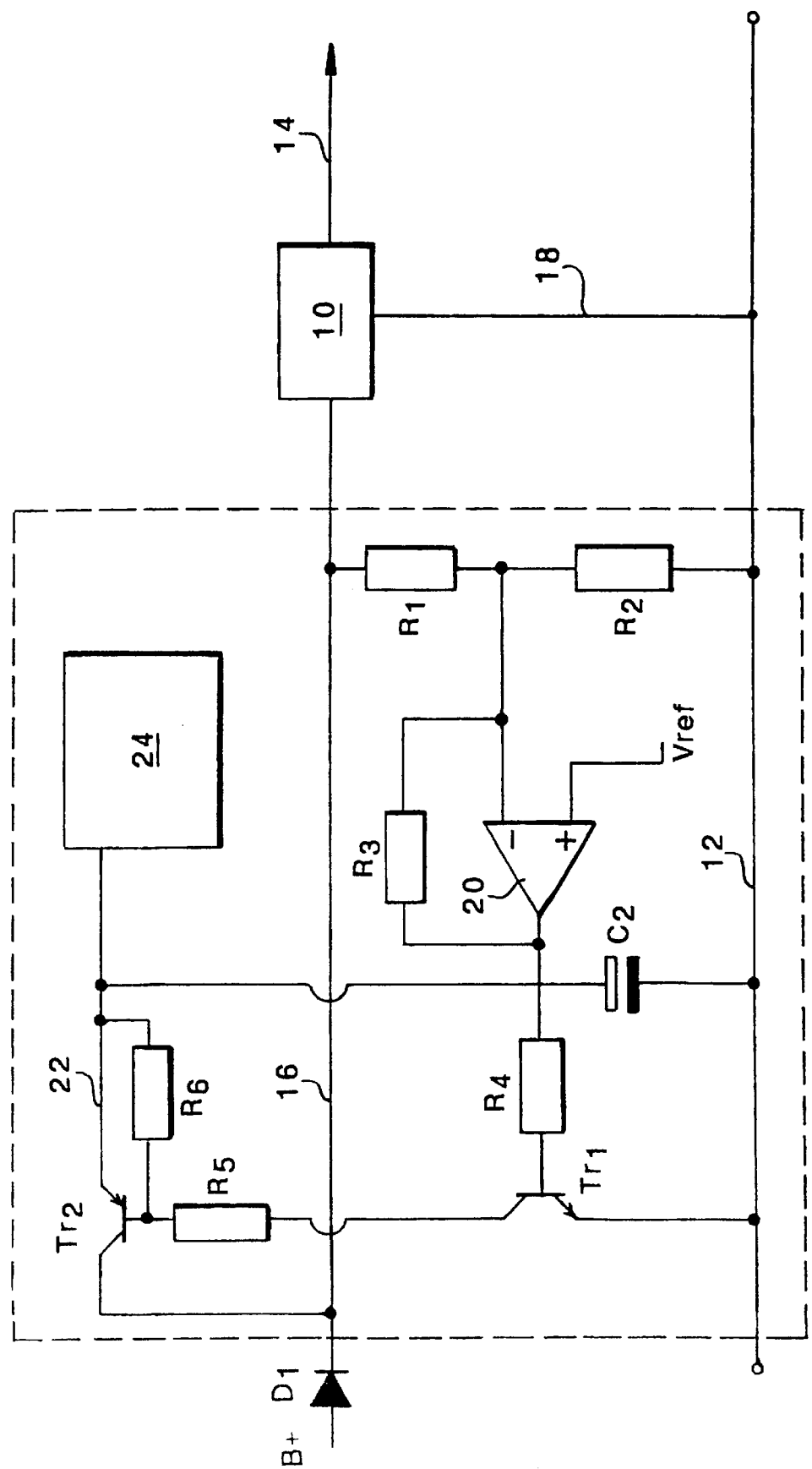
FIG. 2 is a circuit diagram of one embodiment of an ECU supply voltage circuit in accordance with the present invention.

FIG. 3 illustrates the operation of the circuit of FIG. 2 when the supply voltage $B^+$ is removed completely at time $t_1$. Initially, the input to the regulator on line 16 is at $V_1$, being less than $B^+$ by virtue of the voltage drop across $D_1$. The output of the regulator 10 is constant at Vr. When $B^+$ collapses to zero at time $t_1$, the circuit operates to hold the voltage on line 16 at $V_2$ above the drop-out voltage of the regulator, until time $t_2$ when no further charge is available and the input to the regulator, and hence its output fall to zero. By virtue of the action of this circuit, the time period $t_2$ to $t_1$ is increased significantly compared to the equivalent time period which would be available without the voltage boosting action of the circuit. In actual operation of course, the supply interruption would not be continuous but would be returned well before time $t_2$. No break in the output of the regulator 10 would then occur.

A number of advantages can be associated with the present circuit, as follows.

1) the physical size of the capacitor used in the ECU that would give equal performance to the old method discussed in connection with FIG. 1 is smaller, when the same construction of electrolytic capacitor is used.
2) the problems of ESR changes with temperature are minimised.
3) the cost of an ECU can be cheaper.
4) the system is more capable of dealing with supply interruptions when an electrolytic capacitor of the same type is used.
5) a large bulky capacitor can be difficult to house securely in an ECU; the present method is more robust.
6) the rated working voltage of the capacitor can be lower as it does not experience zener diode clamp voltage.
7) the assembly time of an ECU is lower as smaller capacitors are available in surface mount; the prior art method may require manual soldering of the capacitor.
8) the printed circuit board used to house the circuit can be entirely surface mount; plated through holes to secure the capacitor are not required.
9) the method allows non-electrolytic capacitors to be used, capacitors constructed from different materials can have significant advantages such as :longer life, chemical resistance, temperature, higher charge densities.

10) the ECU can accommodate supply interruptions from a lower battery voltage.

11) non-polarised capacitors can be used.

12) the capacitors operating voltage and rated working voltage can be equal utilising the maximum storage capability of the capacitor.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A voltage supply circuit for an Electronic Control Unit comprising:

a voltage regulator having an input terminal and an output terminal, said output terminal adapted to be continuously connected to the Electronic Control Unit, said voltage regulator also having a ground terminal;

a power supply having a ground terminal connected to said voltage regulator ground terminal, said power supply also having a supply terminal;

a diode having a cathode connected to said supply terminal of said power supply and an anode connected to said voltage regulator input terminal;

a capacitor having first and second ends, said first end of said capacitor connected to said voltage regulator ground terminal;

a charge supply connected said second terminal of said capacitor, said charge supply operable to charge said capacitor to a voltage which is greater than the voltage available at said supply terminal of said power supply;

an electronic switch connected between said second terminal of said capacitor and said input terminal of said voltage regulator, said electronic switch including a control port; and a controller having first and second input ports and an output port, said first controller input port connected to said voltage regulator input terminal and said second controller input port connected to a reference voltage, said controller output port connected to said electronic switch input terminal with said controller being operative to cause said electronic switch to connect said second terminal of said capacitor to said voltage regulator input terminal when said power supply voltage decreases to a predetermined voltage such that said capacitor maintains the voltage at said voltage regulator input terminal above said predetermined level for a period of time.

2. The voltage supply circuit according to claim 1 wherein said charge supply includes a charge pump, said charge pump being connected directly to said second terminal of said capacitor.

3. The voltage supply circuit according to claim 2 wherein said charge pump is an $n^{th}$ order voltage multiplier.

4. The voltage supply circuit according to claim 2 wherein said electronic switch includes a transistor having an input terminal connected to said second capacitor terminal and an output terminal connected to said voltage regulator input terminal, said transistor also having a control terminal connected to said controller, said controller being coupled to said power supply and being operative to cause said transistor to be in a non-conductive state when said power supply voltage is above said predetermined voltage and to cause said transistor to be in a conductive state when said power supply voltage decreases to said predetermined voltage.

5. The voltage supply circuit according to claim 4 wherein said controller is further operative to cause said transistor to switch back to a non-conductive state when said power supply rises above said predetermined voltage.

6. The voltage supply circuit according to claim 4 wherein said input terminal of said transistor is an emitter, said output terminal is a collector and said control terminal is a base.

7. The voltage supply circuit according to claim 4 further including a first resistor connected between said transistor emitter and said transistor base and a second resistor connected between said transistor base and said controller.

8. The voltage supply circuit according to claim 4 wherein said transistor is a first transistor, said first transistor having a first bias resistor connected between its input and control terminals, and further wherein said controller includes a second transistor having an input terminal connected through a second bias resistor to said control terminal of said first transistor and an output terminal connected to said first end of said capacitor, said second transistor also having a control terminal connected to an output terminal of a comparator, said comparator also having a first input terminal connected to said input terminal of said voltage regulator and a second input terminal connected to a reference voltage, said comparator being operative when said voltage regulator input voltage decreases to said reference voltage to cause said second transistor to change condition whereby said first transistor is changed to said conducting state.

9. The voltage supply circuit according to claim 8 wherein said second transistor input terminal is a collector, said second transistor output terminal is an emitter and said second transistor control terminal is a base.

10. The voltage supply circuit according to claim 8 wherein said comparator includes an operational amplifier.

11. The voltage supply circuit according to claim 10 wherein said reference voltage is said predetermined voltage.

12. The voltage supply circuit according to claim 10 further including a voltage divider connected between said input and ground terminals of said voltage regulator, said voltage divider including a pair of resistors connected in series, and further wherein said first input terminal of said comparator is connected to said common junction of said pair of voltage divider resistors.

* * * * *